US008290210B2

(12) United States Patent
Fahn et al.

(10) Patent No.: US 8,290,210 B2
(45) Date of Patent: Oct. 16, 2012

(54) METHOD AND SYSTEM FOR GESTURE RECOGNITION

(75) Inventors: Chin-Shyurng Fahn, Taipei (TW); Chung-Nan Yang, Taoyuan County (TW)

(73) Assignee: National Taiwan University of Science and Technology, Taipei (TW)

( * ) Notice: Subject to any disclaimer, the term of this patent is extended or adjusted under 35 U.S.C. 154(b) by 456 days.

(21) Appl. No.: 12/579,409

(22) Filed: Oct. 15, 2009

(65) Prior Publication Data

US 2010/0329509 A1  Dec. 30, 2010

(30) Foreign Application Priority Data

Jun. 30, 2009  (TW) .............................. 98122149 A

(51) Int. Cl.
*G06K 9/00* (2006.01)
*G06K 9/46* (2006.01)

(52) U.S. Cl. .......................... 382/103; 382/107; 382/194

(58) Field of Classification Search .................. 382/103, 382/107, 190, 165, 181, 194; 715/863
See application file for complete search history.

(56) References Cited

U.S. PATENT DOCUMENTS

| | | | | |
|---|---|---|---|---|
| 6,819,782 | B1 * | 11/2004 | Imagawa et al. | 382/115 |
| 7,593,552 | B2 * | 9/2009 | Higaki et al. | 382/118 |
| 7,924,271 | B2 * | 4/2011 | Christie et al. | 345/173 |
| 7,956,847 | B2 * | 6/2011 | Christie | 345/173 |
| 8,086,971 | B2 * | 12/2011 | Radivojevic et al. | 715/863 |

OTHER PUBLICATIONS

Oka, et al. (Real-time tracking of multiple fingertips and gesture recognition for augmented desk interface systems), IEEE, pp. 1-6, 2002.*

* cited by examiner

*Primary Examiner* — Daniel Mariam
(74) *Attorney, Agent, or Firm* — Jianq Chyun IP Office

(57) ABSTRACT

A method and a system for gesture recognition are provided for recognizing a gesture performed by a user in front of an electronic product having a video camera. In the present method, an image containing the upper body of the user is captured and a hand area in the image is obtained. The hand area is fully scanned by a first couple of concentric circles. During the scanning, a proportion of a number of skin color pixels on an inner circumference of the first couple of concentric circles and a proportion of a number of skin color pixels on an outer circumference of the first couple of concentric circles are used to determine a number of fingertips in the hand area. The gesture is recognized by the number of fingertips and an operation function of the electronic product is executed according to an operating instruction corresponding to the recognized gesture.

31 Claims, 10 Drawing Sheets

METHOD AND SYSTEM FOR GESTURE RECOGNITION

CROSS-REFERENCE TO RELATED APPLICATION

This application claims the priority benefit of Taiwan application serial no. 98122149, filed Jun. 30, 2009. The entirety of the above-mentioned patent application is hereby incorporated by reference herein and made a part of specification.

BACKGROUND OF THE INVENTION

1. Field of the Invention

The invention relates to a method of gesture recognition, and more particularly to a method of recognizing a gesture according to fingertip and palm features and relevant applications thereof.

2. Description of Related Art

Currently, in known methods using gestures to operate the computer system, the user needs to wear special gloves so as to detect changes in bending fingers through sensory devices equipped on the gloves for recognizing types of gestures and controlling the computer system according to relevant instructions. Furthermore, in some kinds of gloves, each fingertip is labeled with a different color or mounted with a light emitting diode (LED). Therefore, when the fingers of the user are bended, the type of the gesture is determined according to both the color and the change in light positions, so that the computer system is operated according to different commands. However, since the price of these kinds of gloves is very high, ordinary users do not own such devices easily. Moreover, when the user wears the gloves to operate the computer system, inconveniences usually arise due to the volume and weight of the gloves.

SUMMARY OF THE INVENTION

Accordingly, the invention is directed to a method and a system of gesture recognition. This method and the system recognize a gesture of a user through captured images and replaces an input device such as a mouse, a keyboard, and a joystick with hands, so that the user can operate electronic products more conveniently.

The invention is directed to a method of gesture recognition, configured to recognize the gesture performed by the user in front of an electronic product. With this method, an image including the user is first captured. Next, a hand area in the image is obtained. The hand area is fully scanned by a first couple of concentric circles. A number of fingertips in the hand area is determined according to a proportion of a number of skin color pixels on an inner circumference of the first couple of concentric circles as well as a proportion of the number of skin color pixels on an outer circumference of the first couple of concentric circles. Finally, an operation function of the electronic product is executed according to an operating instruction corresponding to the recognized gesture.

From another perspective, a system of gesture recognition is provided in the invention. The system of gesture recognition includes a hand area detection module, a fingertip feature capture module, a gesture recognition module, and a function execution module. Here, the hand area detection module obtains the hand area in the image captured by the image capture module, the image contains the upper body of a user while operating the electronic product, and the user performs a gesture in front of the electronic product. The fingertip feature capture module scans the hand area by a first couple of concentric circles and determines a number of fingertips in the hand area according to a proportion of a number of skin color pixels on an inner circumference of the first couple of concentric circles and a proportion of the number of skin color pixels on an outer circumference of the first couple of concentric circles during the scanning. The gesture recognition module recognizes the gesture according to the number of fingertips. The function execution module executes an operation function of the electronic product according to an operating instruction corresponding to the recognized gesture.

In the light of the foregoing, in the invention, the image of the gesture performed by the user in front of the electronic product is captured directly with the video camera. The gesture performed by the user is recognized according to the fingertip and the palm features so as to execute the operation function of the electronic product according to the operation instruction corresponding to the recognized gesture. Hence, the user is capable of operating the electronic product directly by hands, thereby greatly enhancing the convenience and pleasure in operation.

In order to make the aforementioned and other features as well as the advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF EMBODIMENTS

Figure 1:
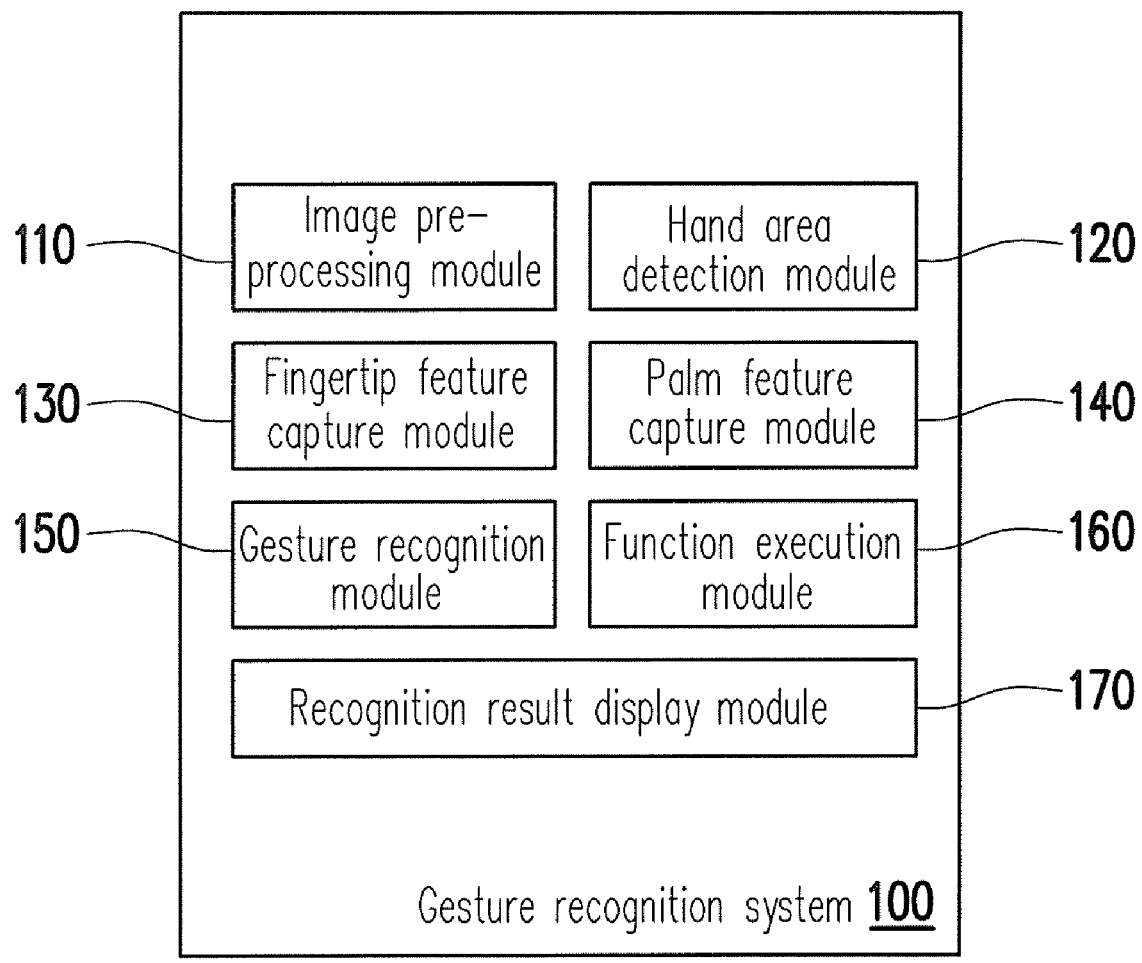
FIG. 1 is a block diagram illustrating a system of gesture recognition according to an embodiment of the invention.

FIG. 1 is a block diagram illustrating a system of gesture recognition according to an embodiment of the invention. Referring to FIG. 1, a gesture recognition system 100 comprises an image pre-processing module 110, a hand area detection module, a fingertip feature capture module 130, a palm feature capture module 140, a gesture recognition module 150, a function execution module 160, and a recognition result display module 170. In the present embodiment, the gesture recognition system 100 recognizes a gesture performed by a user in front of an electronic product (e.g. a computer system, a computer/television game, an information appliance and the like) according to the features of fingertips and palms, thereby operating the electronic product according to an operating instruction. Here, the computer system is a desktop computer system, a notebook computer system and the like, while the information appliance is a television, a television game device and the like. The present embodiment is not limited thereto.

When the image capture module (e.g., a video camera) of the electronic product captures an image of the user in front of the electronic product, and the user performs a gesture right in front of the electronic product, the image pre-processing module 110 then obtains the aforementioned image and performs pre-processing thereto, so that the hand area detection module 120 locates the hand area in the image accurately. The fingertip feature capture module 130 and the palm feature capture module 140 scan the entire hand area using two concentric circles of different sizes respectively, and consequently determine a number of fingertips and a palm position in the hand area. The gesture recognition module 150 recognizes a type of the gesture according to the information provided by the fingertip feature capture module 130 and the palm feature capture module 140. The function execution module 160 executes the operation function of the electronic product according to the operating instruction corresponding to the recognized gesture. Moreover, in a process of recognizing the gesture, the recognition result display module 170 demonstrates a recognition result for the user to examine.

Through the operation of the gesture recognition system 100, the user no longer requires input devices such as a keyboard, a mouse, a joystick and the like to operate the electronic product. Instead of applying the input devices, the user can now sit in front of the electronic product, and perform a pre-defined gesture. The gesture recognition system 100 then recognizes the type of the gesture to control the electronic product for executing the corresponding operating function. In the following embodiment, an operating process of the gesture recognition system 100 is further graphically shown in detail.

Figure 2:
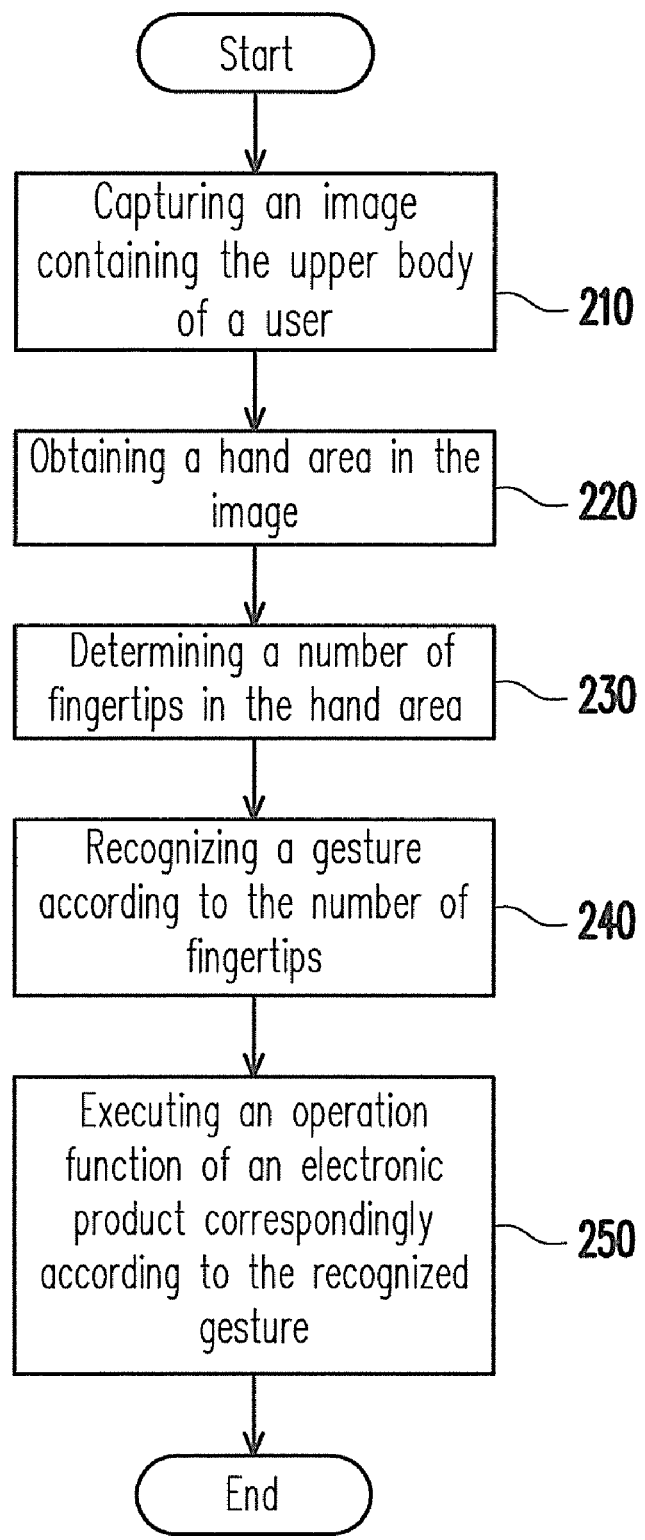
FIG. 2 is a flowchart illustrating a method of gesture recognition according to an embodiment of the invention.

FIG. 2 is a flowchart illustrating a method of gesture recognition according to an embodiment of the invention. Referring to FIG. 1 and FIG. 2 simultaneously, in the present embodiment, the user is in front of an electronic product such as a computer system, a computer/television game, an information appliance and the like, and the image capture module (e.g., the video camera) of the electronic product captures an image containing the upper body of the user. Therefore, when the user performs the gesture in front of the electronic product, the image captured by the image capture module then includes the gesture performed by the user.

Firstly, as illustrated in Step 210, after acquiring the image captured by the image capture module, the image pre-processing module 110 obtains a pre-determined skin color value and extracts a plurality of skin color areas satisfying the pre-determined skin color value from the image. In the present embodiment, the pre-determined skin color value is adjusted according to the differences among races. Moreover, the image pre-processing module 110 operates through a dilation operation of mathematical morphology to fill in blank pixels in the skin color areas, filters out skin color-like pixels in peripherals of the skin color areas by an erosion operation, and labels adjacent skin color areas as a same area by labeling connected components.

Next, as shown in Step 220, the hand area in the image is obtained through the hand area detection module 120. In the present embodiment, the hand area detection module 120 extracts three skin color areas possessing the top three largest areas in all of the skin color areas captured by the image pre-processing module 110. Thereafter, the hand area detection module 120 analyzes whether each of the three skin color areas has a facial feature. Here, the facial feature includes a hair feature and a texture feature consisting of two eyes, two eye-brows, one nose, one mouth, and two ears. Since the facial feature is more obvious and easier to be recognized, the hand area detection module 120 first finds a human face located in one of the three skin color areas possessing the top three largest areas, and then labels the remaining portions as the hand areas. Thus, of the three skin color areas, the area having the facial feature is determined and labeled as a face area by the hand area detection module 120, and the area without the facial feature is determined and labeled as the hand area.

Generally, when the user performs a gesture, the most direct method is to show different numbers of fingers. Therefore, after the hand area is obtained, the number of fingers showed by the user is determined through the fingertip feature captured. As shown in Step 230, the fingertip feature capture module 130 scans the entire hand area by a first couple of concentric circles, and determines a fingertip position and a number of fingertips in the hand area according to a ratio of a number of skin color pixels on the inner circumference of the first couple of concentric circles to the number of skin color pixels on the outer circumference of the first couple of concentric circles during the scanning.

In the following, a detailed process of obtaining the fingertip position is further illustrated in FIG. 3. As illustrated in Step 310, the fingertip feature capture module 130 first places a first concentric center position at a first predetermined position in the hand area. In the present embodiment, the first predetermined position is, for example, at the upper left hand corner of the hand area. It should be illustrated that the first predetermined position must display the first couple of concentric circles in the hand area completely.

Afterwards, the fingertip feature capture module 130 determines whether the current first concentric center position is the fingertip position according to ratios of the number of skin color pixels on the inner circumference of the first couple of concentric circles and the number of skin color pixels on the outer circumference of the first couple of concentric circles respectively to the number of pixels included on the inner circumference of the first couple of concentric circles and the number of pixels included on the outer circumference of the first couple of concentric circles.

In detail, since the fingertips have a semi-arc shape, when the first couple of concentric circles is used to scan the fingertips of the user, every pixel included on the inner circumference of the first couple of concentric circles are skin color pixels. Additionally, a ratio of the number of skin color pixels on the outer circumference of the first couple of concentric circles to the number of pixels included on the outer circumference of the first couple of concentric circles does not exceed a first predetermined value (e.g., 40%). According to the aforementioned determination condition, as shown in Step 320, the fingertip feature capture module 130 first determines whether the number of skin color pixels on the inner circumference of the first couple of concentric circles equals the number of pixels included on the inner circumference of the first couple of concentric circles. Once the fingertip feature capture module 130 has detected pixels that do not satisfy the skin color value on the inner circumference of the first couple of concentric circles, the fingertip feature capture module 130 then directly determines the current first concentric center position not to be the fingertip position as shown in Step 350. However, when the number of skin color pixels on the inner circumference of the first couple of concentric circles equals the number of pixels included on the inner circumference of the first couple of concentric circles, then in Step 330, whether the ratio of the number of skin color pixels on the outer circumference of the first couple of concentric circles to the number of pixels included on the outer circumference of the first couple of concentric circles is smaller than the first predetermined value is determined If the ratio of the number of skin color pixels on the outer circumference of the first couple of concentric circles to the number of pixels included on the outer circumference of the first couple of concentric circles is greater than or equal to the first predetermined value, the current first concentric center position is identified not to be the fingertip position as shown in Step 350. On the contrary, when the ratio is smaller than the first predetermined value as shown in Step 340, the current first concentric center position is identified to be the fingertip position. In the present embodiment, after the identification of the fingertip position, the fingertip feature capture module 130 also records the fingertip position.

Next, in Step 360, whether the number of fingertip positions obtained has reached a certain number (e.g., 5) or the scanning of the hand area has finished is determined. If the number of fingertip positions obtained has reached the certain number or the scanning of the hand area has finished, the process of obtaining the fingertip positions is terminated. If not, then as shown in Step 370, the fingertip feature capture module 130 moves the first concentric center position toward a predetermined direction (such as toward the right) by taking a pixel as a unit of movement, and returns to Step 320 to perform the aforementioned determination. The fingertip feature capture module 130 repeats Step 320 through Step 370 continuously until the number of fingertip positions obtained has reached the certain number or the scanning of the hand area has finished.

Figure 3:
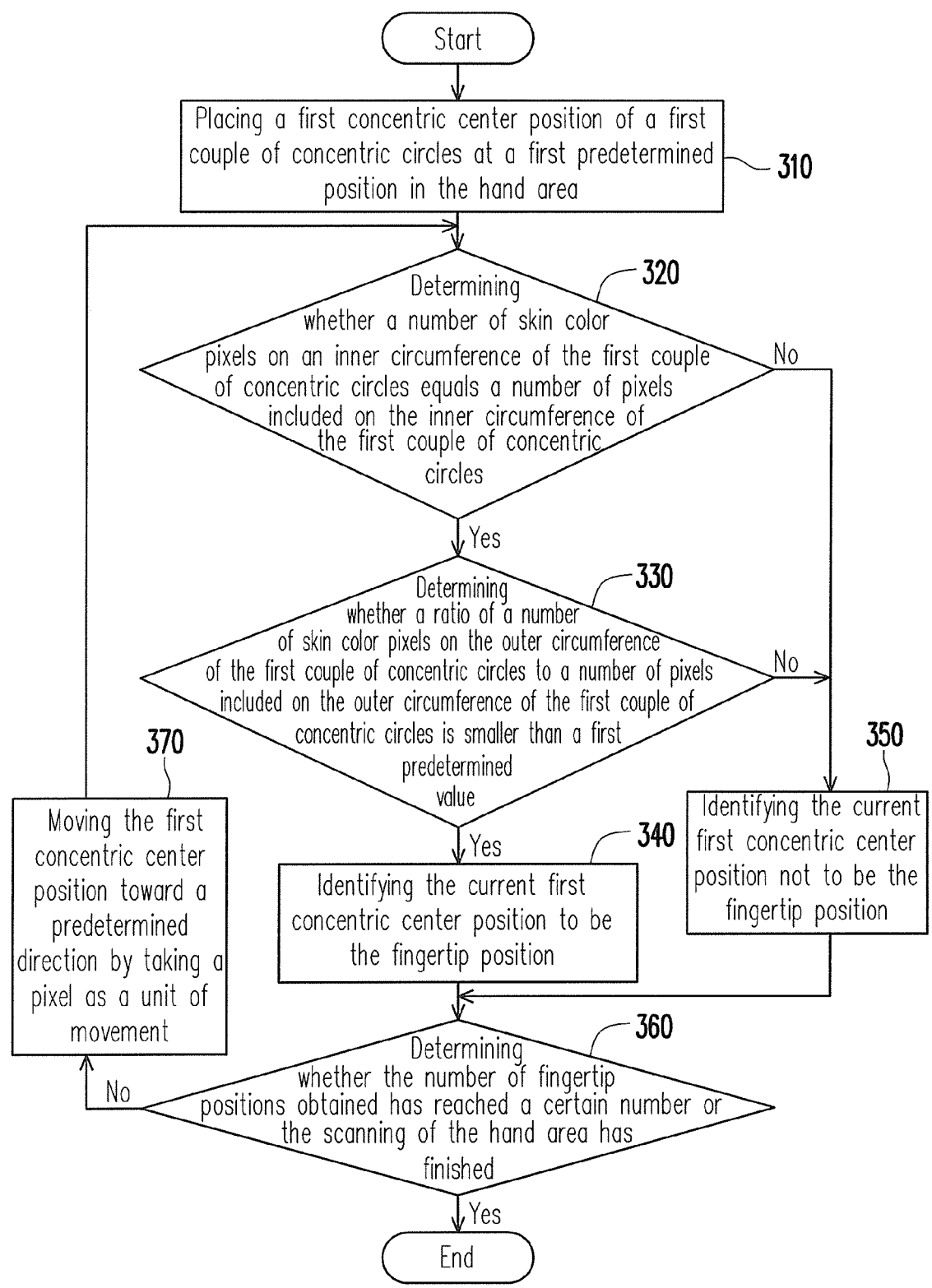
FIG. 3 is a flowchart illustrating a method of obtaining a fingertip position according to an embodiment of the invention.

All fingertip positions in the hand area are obtained through every step shown in FIG. 3. The fingertip feature capture module 130 then uses the number of the fingertip positions obtained as the number of fingertips in the hand area.

Figure 4:
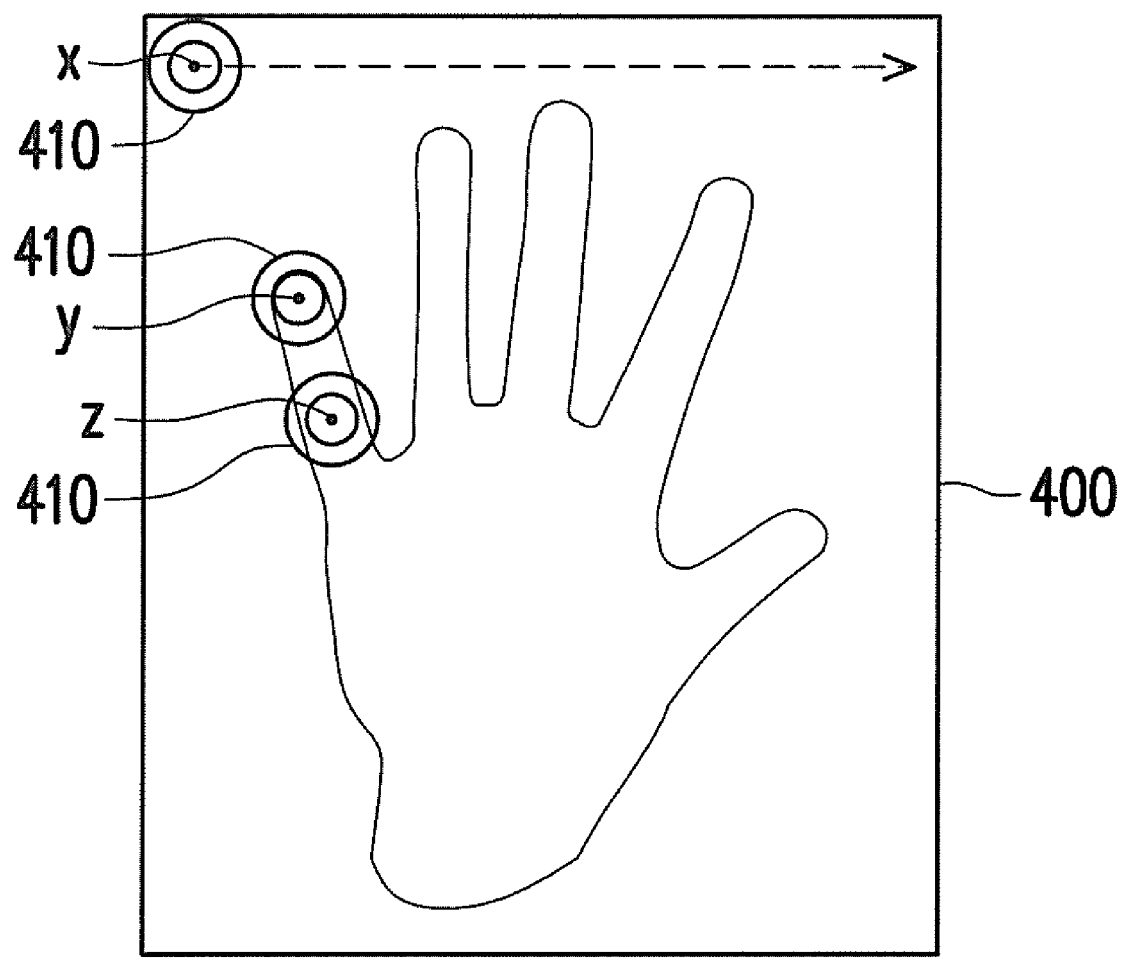
FIG. 4 is a schematic diagram illustrating a hand area according to an embodiment of the invention.

FIG. 4 is a schematic diagram illustrating a hand area according to an embodiment of the invention. In the present embodiment, a first predetermined value is assumed to be 40%, a number of pixels included on the inner circumference of a first couple of concentric circles 410 is 80, and the number of pixels included on the outer circumference of the first couple of concentric circles 410 is 100. When determining a number of fingertips in a hand area 400, the fingertip feature capture module 130 first places a center position of the first couple of concentric circles 410 at a first predetermined position (e.g., pixel x) in the hand area 400. When determining the inner circumference of the first couple of concentric circles 410, if the fingertip feature capture module 130 finds the first obtained pixel not to be a skin color pixel, the fingertip feature capture module 130 can directly determine the current center position (that is, the pixel x) not to be the fingertip position. Afterward, the fingertip feature capture module 130 moves the center position of the first couple of concentric circles to the next examination position by taking a pixel as a unit of movement. For example, when the center position of the first couple of concentric circles 410 is moved to a pixel point y, if every pixel on the inner circumference of the first couple of concentric circles is a skin color pixel and the ratio of the number of skin color pixels on the outer circumference of the first couple of concentric circles to the number of pixels included on the outer circumference of the first couple of concentric circles is smaller than the first predetermined value, then the fingertip feature capture module 130 determines the pixel y to be the fingertip position. However, when the center position of the first couple of concentric circles 410 is moved to a pixel point z, although every pixel on the inner circumference of the first couple of concentric circles is a skin color pixel, the ratio of the number of skin color pixels on the outer circumference of the first couple of concentric circles to the number of pixels included on the outer circumference of the first couple of concentric circles is not smaller than the first predetermined value. Consequently, the fingertip feature capture module 130 determines the pixel z not to be the fingertip position. In other words, in the present embodiment, when the fingertip feature capture module 130 finds the $41^{st}$ skin color pixel on the outer circumference of the first couple of concentric circles, the current first concentric center position is determined not to be the fingertip position.

Subsequently, Step 240 in FIG. 2 is followed to process. When the number of fingertips determined by the fingertip feature capture module 130 is 1, this represents the user has showed one finger. When the number of fingertips determined by the fingertip feature capture module 130 is 2, this represents the user has showed two fingers and so on. Therefore, the gesture recognition module 150 recognizes the type of the gesture according to the number of fingertips. For instance, the gesture that can be recognized by the gesture recognition module 150 includes situations where the user shows 0 to 5 fingers each hand.

Finally, in Step 250, the function execution module 160 executes the operation function of the electronic product according to the operating instruction corresponding to the gesture recognized by the gesture recognition module 150. The operation function at least includes a mouse function and a keyboard function of the computer system as well as a joystick function of the computer/television game, and further includes an operation interface and the like, such as a cursor position control, an object selection, a file duplication, a file movement, a mouse's right button control, a multimedia file control, a volume control, an application program control and the like. It should be noted that the scope of the operation function is not limited thereto.

In another embodiment, when the hand area detection module 120 obtains two hand areas (referred to as a left hand area and a right hand area), this represents the user shows both hands in front of the electronic product. Accordingly, the fingertip feature capture module 130 scans the left hand area by the first couple of concentric circles and executes every step shown in FIG. 2 to determine the number of fingertips in the left hand area. Similarly, the fingertip feature capture module 130 scans the right hand area by the first couple of concentric circles and executes every step shown in FIG. 2 to determine the number of fingertips in the right hand area. After the numbers of fingertips in the left hand area and the right hand area are obtained respectively, the gesture recognition module 150 recognizes the gesture according to the numbers of fingertips in the two hand areas. In the present embodiment, the number of fingertips in the left hand area is 0 to 5, and the number of fingertips in the right hand area is also 0 to 5. Therefore, the type of gestures recognized by the gesture recognition module 150 reaches 36 (6*6) types. In other words, the function execution module 160 is capable of executing at most 36 operation functions of the electronic product according to the 36 recognized gestures.

Figure 5:
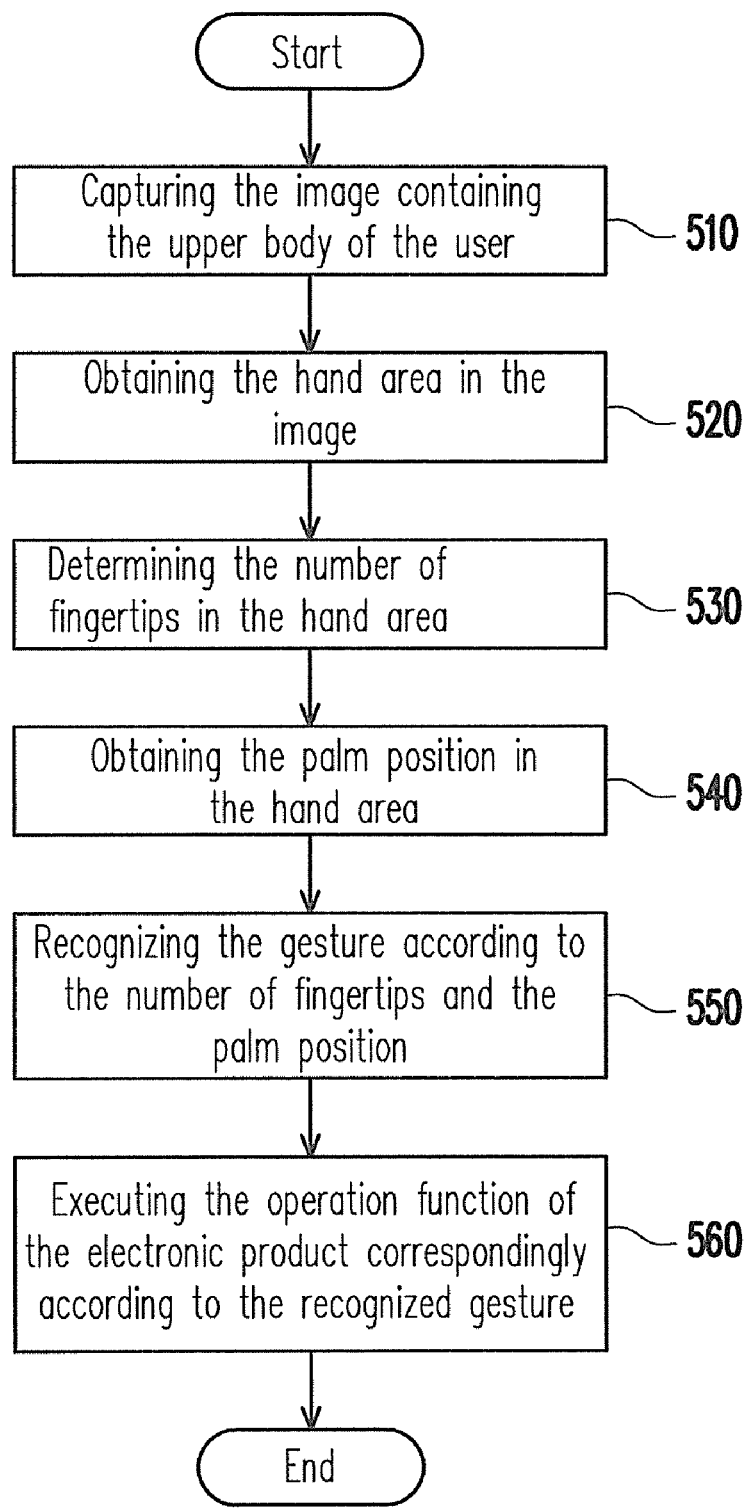
FIG. 5 is a flowchart illustrating a method of gesture recognition according to another embodiment of the invention.

FIG. 5 is a flowchart illustrating a method of gesture recognition according to another embodiment of the invention.

In the present embodiment, in order to expand the number of distinguishable gestures, the gesture recognition system 100 also recognizes a directionality of the gesture of the user by virtue of the fingertip feature and the palm feature. Referring to FIG. 2 and FIG. 5 simultaneously, Step 510 through Step 530 in FIG. 5 and Step 210 through Step 230 in FIG. 2 are identical or similar. That is, the hand areas in the images are both obtained and the numbers of fingertips in the hand areas are both determined, thus, detailed descriptions thereof are not repeated herein.

In the present embodiment, a direction of the gesture is determined through a relative relationship between the palm and the fingertip positions. As a result, the palm feature capture module 140 is utilized to find the palm position in the hand area. Hence, in Step 540, the palm feature capture module 140 scans the entire hand area by a second couple of concentric circles and obtains a palm position in the hand area according to ratio of the number of skin color pixels on an inner circumference of the second couple of concentric circles to the number of skin color pixels on an outer circumference of the second couple of concentric circles during the scanning. Here, an outer circle and an inner circle of the second couple of concentric circles are both larger than those of the first couple of concentric circles.

Figure 6:
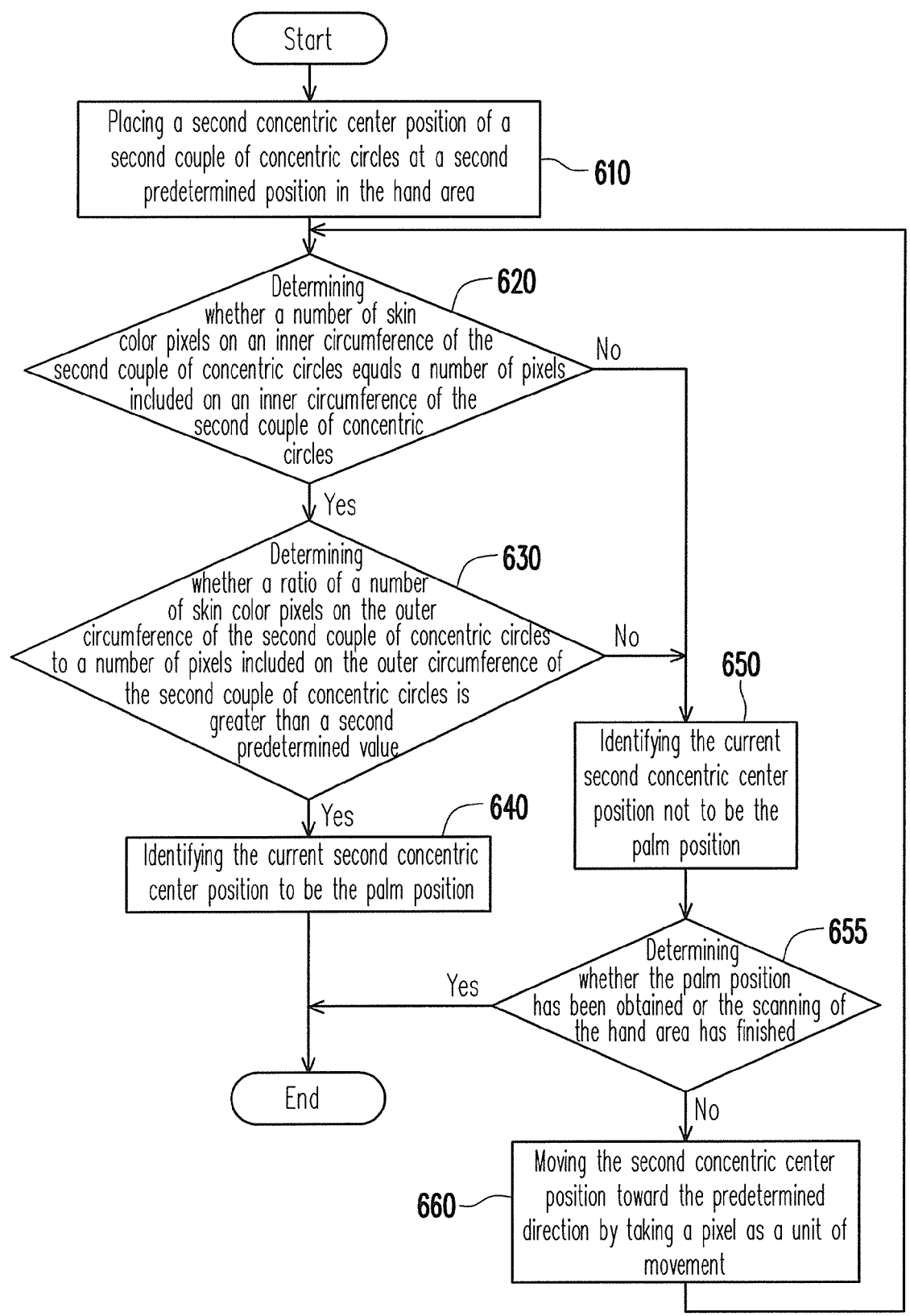
FIG. 6 is a flowchart illustrating a method of obtaining a palm position according to an embodiment of the invention.

In the following, a detailed process of obtaining the palm position is further illustrated in FIG. 6. As depicted in Step 610, the palm feature capture module 140 overlaps the center position of the second couple of concentric circles to a second predetermined position in the hand area. Here, the second predetermined position is, for example, an upper left corner of the hand area. When the second concentric center position is overlapped to the second predetermined position, the second couple of concentric circles must be displayed completely in the hand area.

Afterwards, the palm feature capture module 140 determines whether the current second concentric center position is the palm position according to ratios of the number of skin color pixels on the inner circumference of the second couple of concentric circles and the number of skin color pixels on the outer circumference of the second couple of concentric circles respectively to the number of pixels included on the inner circumference of the second couple of concentric circles and the number of pixels included on the outer circumference of the second couple of concentric circles.

In detail, in Step 620, the palm feature capture module 140 determines whether the number of skin color pixels on the inner circumference of the second couple of concentric circles equals to the number of pixels included on the inner circumference of the second couple of concentric circles, and in Step 630, the palm feature capture module 140 determines whether the ratio of the number of skin color pixels on the outer circumference of the second couple of concentric circles to the number of pixels included on the outer circumference of the couple of second concentric circles is greater than the second predetermined value (e.g., 95%). If the check results of Step 620 and Step 630 are both positive, then the palm feature capture module 140 determines the current second concentric center position to be the palm position. Moreover, the palm feature capture module 140 records the palm position and terminates the process of obtaining the palm position.

However, if the number of skin color pixels on the inner circumference of the second couple of concentric circles is different from the number of pixels included on the inner circumference of the second couple of concentric circles, or when the ratio of the number of skin color pixels on the outer circumference of the second couple of concentric circles to the number of pixels included on the outer circumference of the second couple of concentric circles is smaller than or equal to the second predetermined value, the palm feature capture module 140 determines the current second concentric center position not to be the palm position as shown in Step 650.

When the palm feature capture module 140 determines the current second concentric center position not to be the palm position, the palm feature capture module 140 then determines whether the palm position has been obtained or the scanning of the hand area has finished in Step 655. If the palm position has been obtained or the scanning of the hand area has finished, the process of obtaining the palm position is terminated. If not, then as shown in Step 660, the palm feature capture module 140 moves the second concentric center position toward the predetermined direction by taking a pixel as a unit of movement, and returns to Step 620 to execute the aforementioned determination steps. In other words, the palm feature capture module 140 searches for the palm position in the hand area continuously until the palm position in the hand area has been obtained or the scanning of the hand area has finished.

Figure 7:
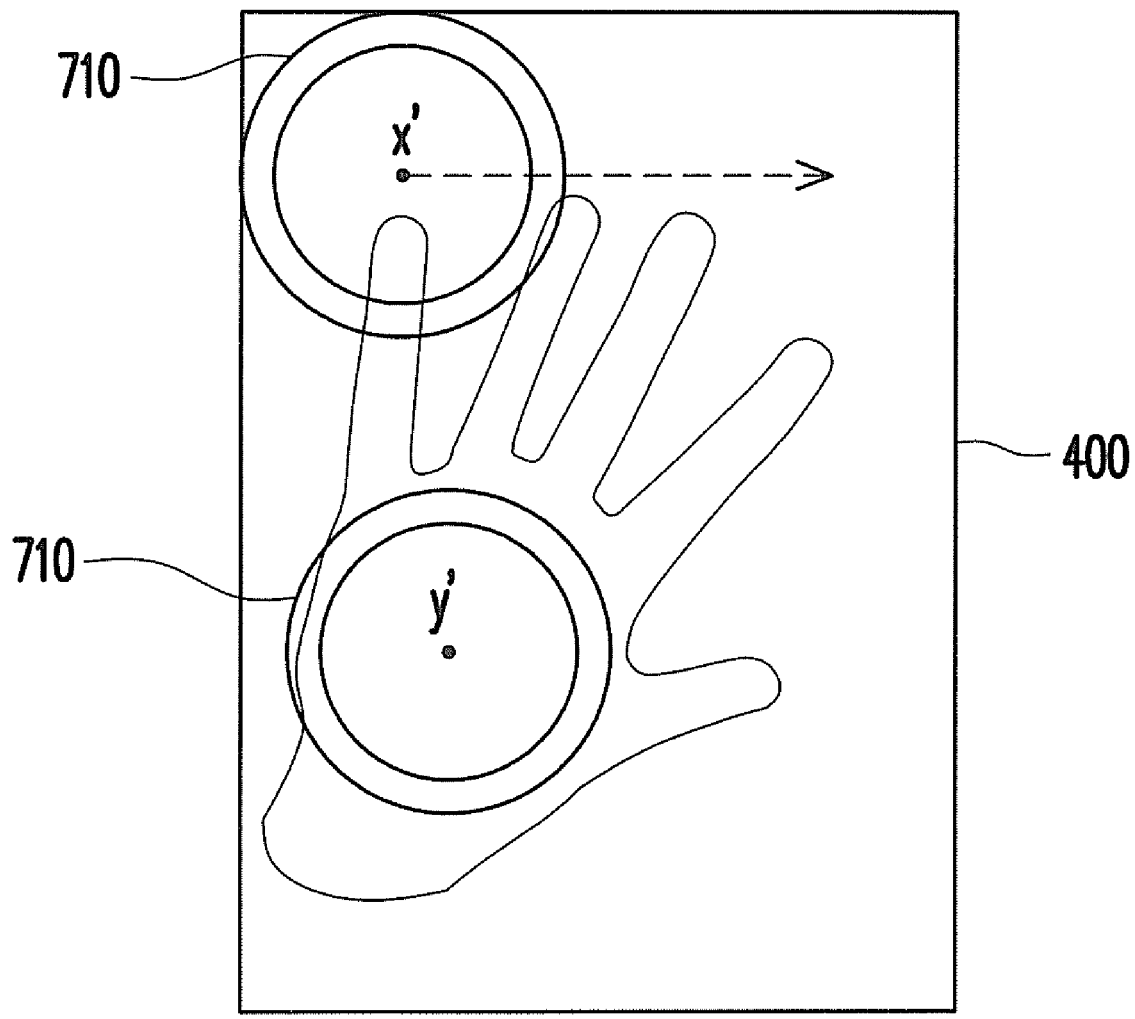
FIG. 7 is a schematic diagram illustrating a hand area according to another embodiment of the invention.

FIG. 7 is a schematic diagram illustrating a hand area according to another embodiment of the invention. In the present embodiment, the number of pixels included on an inner circumference of a second couple of concentric circles 710 is assumed to be 150, the number of pixels included on the outer circumference of the second couple of concentric circles 710 is assumed to be 200, a second predetermined value is assumed to be 95%, and the second predetermined position in the hand area 400 is a pixel x'. When the palm feature capture module 140 s overlaps the center position of the second couple of concentric circles 710 to the pixel x', since the pixels on the inner circumference of the second couple of concentric circles are not all skin color pixels, the palm feature capture module 140 then determines the pixel x' not to be the palm position directly. When the second concentric center position is moved to a pixel y', the number of skin color pixels on the inner circumference of the second couple of concentric circles is assumed to be 150, and the number of skin color pixels on the outer circumference of the second couple of concentric circles is assumed to be 192. Since the number of skin color pixels on the inner circumference of the second couple of concentric circles equals to the number of pixels on the outer circumference of the second couple of concentric circles, and the ratio of the number of skin color pixels on the outer circumference of the second couple of concentric circles to the number of pixels on the outer circumference of the second couple of concentric circles is greater than 95%, the palm feature capture module 140 determines the pixel y' to be the palm position in the hand area 400.

After both the number of fingertips and the fingertip positions have been obtained through the fingertip feature capture module 130 and the palm position has been obtained through the palm feature capture module 140, in Step 550, the feature recognition module 150 utilizes the number of fingertips and the palm position to recognize the gesture performed by the user. Here, the gesture recognition module 150 uses the palm position as a center to define n sector areas. Each of the n sector areas corresponds to a direction respectively, and n is a positive integer. Later, the number of fingertips in each sector area is calculated and a specific sector area covering the most number of fingertip positions is obtained from the n sector areas. Finally, the gesture is determined to conform with the direction corresponding to the specific sector area.

In one embodiment, the gesture recognition module 150 divides the rectangular extent of a gesture into four sector areas using the palm position as the center. These four sector areas respectively correspond to four directions of a gesture facing upward, downward, leftward, and rightward. If the sector area corresponding to upward has the most number of fingertip positions, then the gesture recognition module 150 determines the gesture performed by the user to have an upward directionality. Similarly, if the sector area corresponding to downward has the most number of fingertip positions, then the gesture recognition module 150 determines the gesture performed by the user to have a downward directionality. In another embodiment, when the number of fingertip positions is distributed equally in more than one sector areas or the direction of the gesture cannot be identified clearly, the gesture recognition module 150 then defines the gesture of the user to be a special type.

Figure 8A:
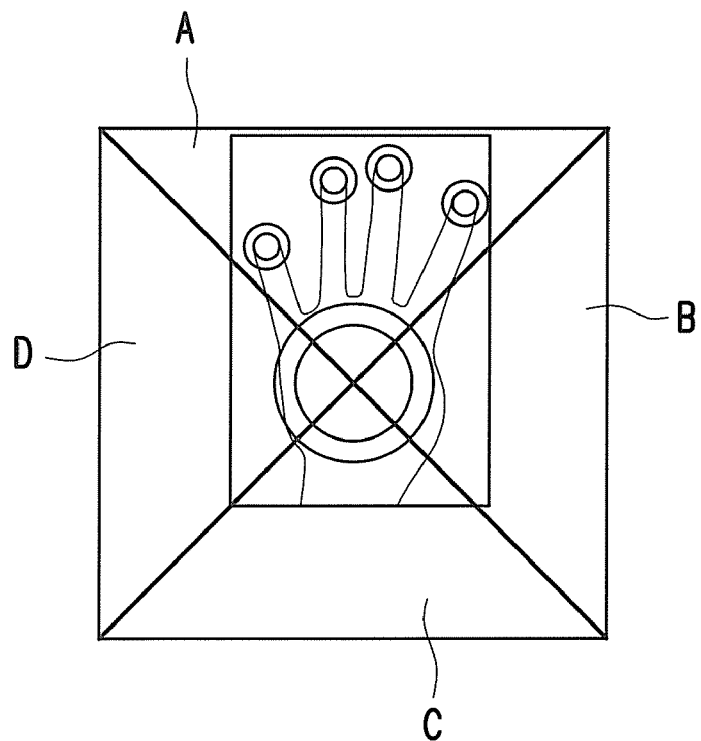
FIGS. 8A, 8B, 8C, and 8D are schematic diagrams illustrating the directions posed by gestures according to an embodiment of the invention.
Figure 8B:
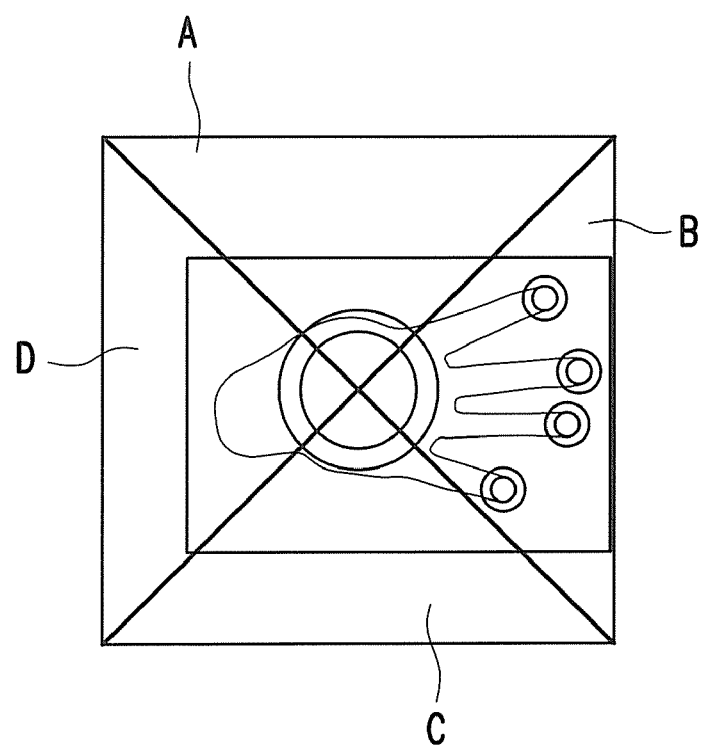
Figure 8C:
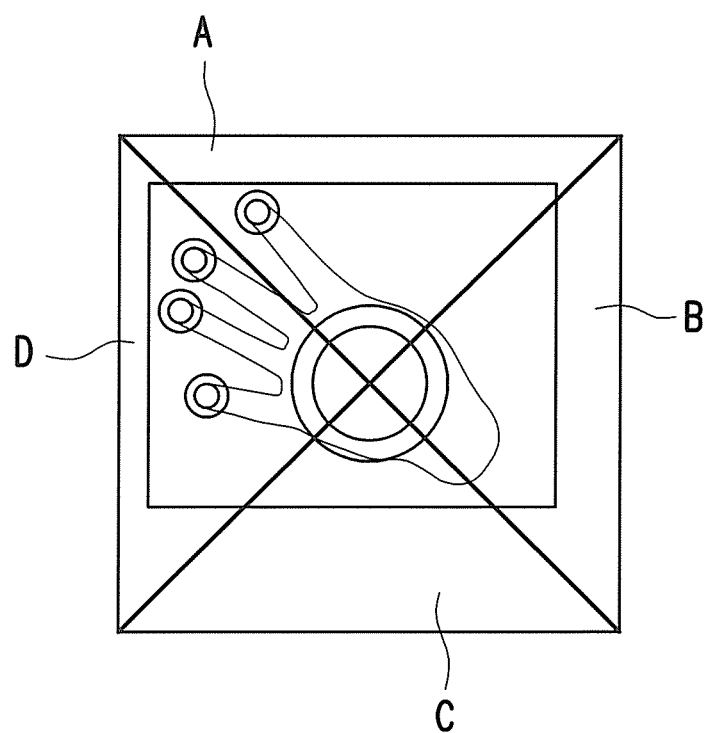
Figure 8D:
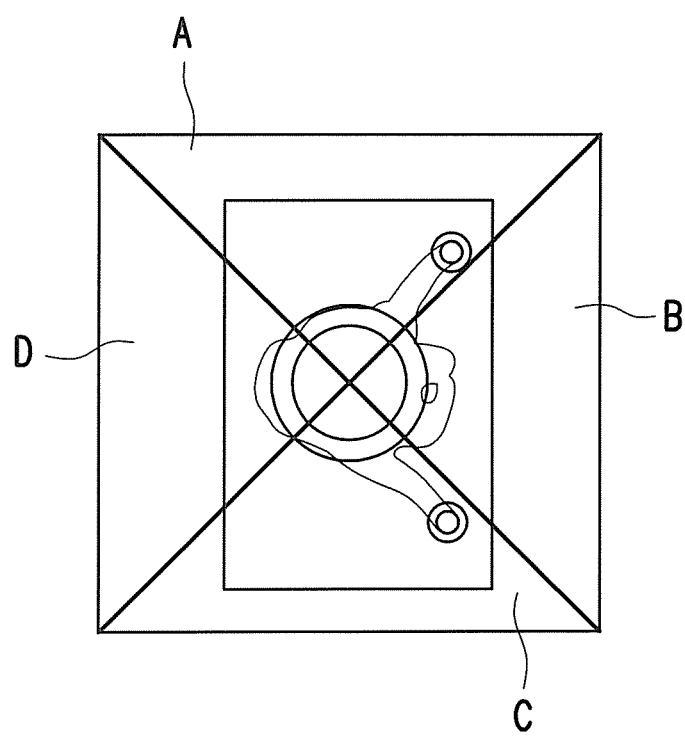

For example, a sector area A, a sector area B, a sector area C, and a sector area D divided by the gesture recognition module 150 correspond to the four directions of a gesture facing upward, rightward, downward, and leftward, respectively. As shown in FIG. 8A, when the fingertip positions all fall within the sector area A, the gesture recognition module 150 identifies the gesture of the user to have the upward directionality, and the number of the fingertip positions is 4. As shown in FIG. 8B, the gesture recognition module 150 identifies the gesture of the user to have the rightward directionality, and the number of the fingertip positions is 4. In FIG. 8C, the sector area D has the most number of fingertip positions. Therefore, the gesture recognition module 150 determines the gesture to have the left directionality, and the number of fingertips in the sector area D is 3 and the number of fingertips in the sector area A is 1. In FIG. 8D, since the sector area A and the sector area C have the same number of fingertip positions, the gesture recognition module 150 determines the gesture to be of other types. In the present embodiment, the numbers of fingertips in the sector area A and the sector area C are both 1.

If the gesture recognition module 150 divides the rectangular extent of a gesture into four sector areas and is capable of identifying situations of the user showing 1 to 5 fingers, the gesture recognition module 150 can then recognize at least 20 (4*5) types of gestures. Finally, as shown in Step 560, the function execution module 160 executes the operation function of the electronic product according to the operating instruction corresponding to the number of fingertips and the direction of the gesture obtained (that is, the recognized gesture).

In another embodiment, when the hand area detection module 120 obtains the two hand areas (referred to as the left hand area and the right hand area), this represents the user showing both hands in front of the electronic product. In such a situation, the fingertip feature capture module 130 scans the left hand area and the right hand area respectively by the first couple of concentric circles to determine the number of fingertips in the left hand area and the number of fingertips in the right hand area. The palm feature capture module 140 scans the left hand area and the right hand area respectively by the second couple of concentric circles to determine the palm position in the left hand area and the palm position in the right hand area. Since the methods of obtaining the number of fingertips and the palm positions are identical or similar to the methods depicted in the aforementioned embodiments, the methods are not repeated herein.

Subsequently, the gesture recognition module 150 determines the left hand direction corresponding to the gesture according to the palm position in the left hand area and a right hand direction corresponding to the gesture according to the palm position in the right hand area. After that, the gesture recognition module 150 recognizes the gesture performed by the user according to the number of fingertips in the left hand area and the left hand direction as well as the number of fingertips in the right hand area and the right hand direction. Accordingly, in the present embodiment, the gesture recognition module 150 is capable of recognizing at least 400 (20*20) different combinations of gestures. In other words, the gesture recognition system 100 is capable of recognizing at least 400 different gestures, and therefore executes 400 different operation functions correspondingly.

For example, when the user shows one finger, the function of controlling the cursor is initiated correspondingly. When the user shows one finger in one hand and two fingers in the other hand, the function of double clicking an input key of the mouse is initiated. In addition, when the user shows three fingers with one hand, a browser is initiated. However, it should be illustrated that the corresponding relationship between the gestures and the operation functions mentioned above are merely exemplary, and the scope of the invention is not limited thereto. Since the number of gesture combinations recognized by the gesture recognition system 100 is great, the user can increase the number of operation functions corresponding to the gestures by oneself. In other words, the user is capable of defining a specific gesture to stand for a certain operation function according to different demands of the user. Accordingly, when the user performs the aforementioned specific gesture, the gesture recognition system 100 then controls the electronic product to execute the operation function defined by the user correspondingly.

Figure 9:
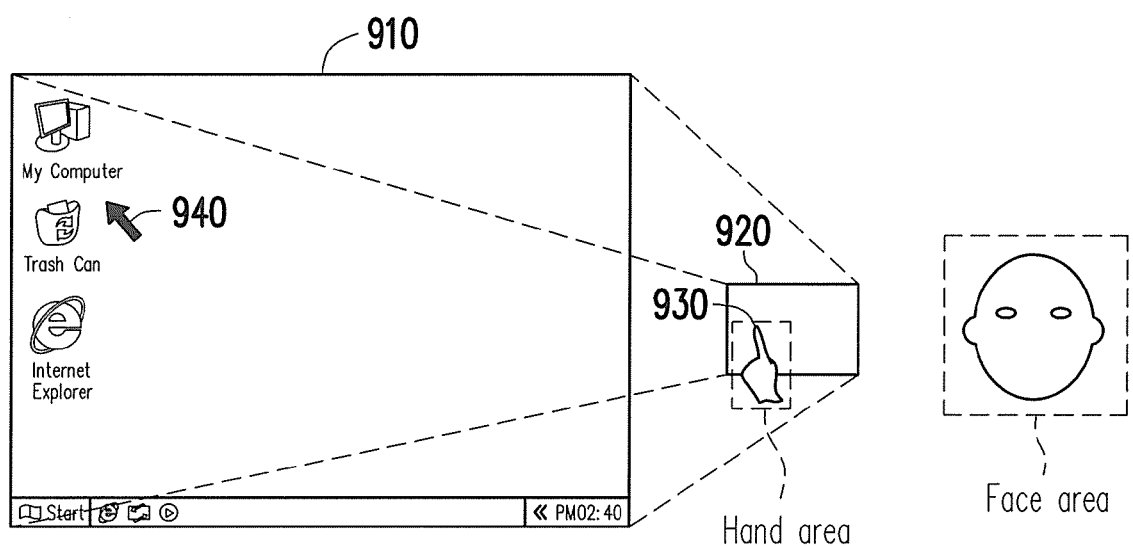
FIG. 9 is a schematic diagram illustrating a virtual mouse panel mapped to a monitor according to an embodiment of the invention.

In one embodiment, when the gesture performed by the user corresponds to the electronic product to initiate the mouse function, the recognition result display module 170 then demonstrates a virtual mouse panel having a size proportionally mapped to the monitors of the electronic product. The virtual mouse panel displays the cursor position according to the operation of the user, so that the user can operate conveniently. FIG. 9 is a schematic diagram illustrating a virtual mouse panel mapped to the monitor according to an embodiment of the invention. In this embodiment, a resolution of a monitor 910 of the electronic product is assumed to be 1,280*800, and a size of the virtual mouse panel 920 is 256*200, for instance. That is, the movement of a pixel on the virtual mouse panel 920 operated horizontally with a fingertip 930 of the user is equal to the movement of five pixels on the monitor 910 of the electronic product operated horizontally with a cursor 940. When the fingertip 930 of the user moves a pixel vertically on the virtual mouse panel 920, the cursor 940 moves four pixels vertically on the monitor 910 of the electronic product.

In another embodiment, the recognition result display module 170 also demonstrates the result of gesture recognition received from the gesture recognition module 150, and the operation function is then executed according to the recognized gesture. Hence, the user can examine the operation status of the gesture recognition system 100 more clearly.

It should be noted that in the above-mentioned embodiment, the fingertip feature capture module 130 and the palm feature capture module 140 can adjust the sizes of the first couple of concentric circles and the second couple of concentric circles correspondingly according to the distance between the user and the electronic product. For example, when the user moves closer to the electronic product, the sizes of the first couple of concentric circles and the second couple of concentric circles become larger. On the contrary, when the user moves farther from the electronic product, the sizes of the first couple of concentric circles and the second couple of concentric circles become smaller. Accordingly, the fingertip feature capture module 130 and the palm feature capture module 140 become more efficient when determining the number of fingertips and the palm positions.

To sum up, the method and the system of gesture recognition provided in the invention merely require the video camera equipped on the electronic product to capture the image of the user performing the gesture, and the hand area is obtained from the image for analyzing the type of the gesture according to the fingertip feature and the palm feature. Here, the type of the gesture is one of a non-directional single hand gesture, a directional single hand gesture, non-directional double hand gestures, directional double hand gestures and so on. After linking the gestures with the operation function of the electronic product, the user can then perform different operations on the electronic product through hands. Hence, not only are the traditional input interfaces such as a mouse and a keyboard needed no more, but the expensive and inconvenient glove sensing device is not required, neither. As a result, the invention is more user-friendly and convenient for the user to operate the electronic product.

Although the invention has been described with reference to the above embodiments, it will be apparent to one of the ordinary skills in the art that modifications to the aforementioned embodiments may be made without departing from the spirit of the invention. Accordingly, the scope of the invention will be defined by the attached claims not by the above detailed descriptions.

What is claimed is:

1. A method of gesture recognition, configured to recognize a gesture performed by a user in front of an electronic product, the method comprising:

capturing an image containing an upper body of the user;
   obtaining a hand area in the image;
   scanning the entire hand area by placing a first concentric center position of a first couple of concentric circles at a first predetermined position in the hand area and moving the first concentric center position toward a predetermined direction to perform the scan and determining a number of fingertips in the hand area according to a number of skin color pixels on an inner circumference of the first couple of concentric circles and a number of skin color pixels on an outer circumference of the first couple of concentric circles during the scanning, wherein the first predetermined position makes the first couple of concentric circles to be displayed in the hand area completely and an outer circle and an inner circle of the first couple of concentric circles have different sizes;
   recognizing the gesture according to the number of fingertips; and
   executing an operation function of the electronic product according to an operating instruction corresponding to the recognized gesture, wherein the electronic product comprises a computer system, a computer/television game, and an information appliance.

2. The method of gesture recognition as claimed in claim 1, wherein the capturing of the image containing the upper body of the user comprises:

capturing the image with a video camera equipped on the electronic product.

3. The method of gesture recognition as claimed in claim 2, wherein the scanning of the hand area by the first couple of concentric circles to determine the number of fingertips in the hand area comprises:

determining whether the current first concentric center position is a fingertip position according to a ratio of the number of skin color pixels on the inner circumference of the first couple of concentric circles to a number of pixels included on the inner circumference of the first couple of concentric circles, and a ratio of the number of skin color pixels on the outer circumference of the first couple of concentric circles to a number of pixels included on the outer circumference of the first couple of concentric circles;
   moving the first concentric center position toward the predetermined direction by taking a pixel as a unit of movement; and
   repeating both the determination of whether the first concentric center position is the fingertip position and the movement of the first concentric center position until a number of the fingertip positions obtained has reached a certain number or the scanning of the hand area has finished, and using the number of the fingertip positions obtained as the number of fingertips.

4. The method of gesture recognition as claimed in claim 3, wherein the determination of whether the current first concentric center position is the fingertip position comprises:

determining whether the number of skin color pixels on the inner circumference of the first couple of concentric circles equals the number of pixels included on the inner circumference of the first couple of concentric circles;
   when the number of skin color pixels on the inner circumference of the first couple of concentric circles equals the number of pixels included on the inner circumference of the first couple of concentric circles, determining whether the ratio of the number of skin color pixels on the outer circumference of the first couple of concentric circles to the number of pixels included on the outer circumference of the first couple of concentric circles is smaller than a first predetermined value;
   when the ratio of the number of skin color pixels on the outer circumference of the first couple of concentric circles to the number of pixels included on the outer circumference of the first couple of concentric circles is smaller than the first predetermined value, identifying the current first concentric center position to be the fingertip position; and
   recording the fingertip position.

5. The method of gesture recognition as claimed in claim 4, wherein after determining whether the number of skin color pixels on the inner circumference of the first couple of concentric circles equals the number of pixels included on the inner circumference of the first couple of concentric circles, the method further comprises:

when the number of skin color pixels on the inner circumference of the first couple of concentric circles does not equal the number of pixels included on the inner circumference of the first couple of concentric circles, then identifying the current first concentric center position not to be the fingertip position.

6. The method of gesture recognition as claimed in claim 4, wherein after determining whether the ratio of the number of skin color pixels on the outer circumference of the first couple of concentric circles to the number of pixels included on the outer circumference of the first couple of concentric circles is smaller than the first predetermined value, the method further comprises:

when the ratio of the number of skin color pixels on the outer circumference of the first couple of concentric circles to the number of pixels included on the outer circumference of the first couple of concentric circles is not smaller than the first predetermined value, identifying the current first concentric center position not to be the fingertip position.

7. The method of gesture recognition as claimed in claim 3, wherein after the number of fingertip positions obtained is used as the number of fingertips, the method further comprises:
  overlapping a second concentric center position of a second couple of concentric circles to a second predetermined position in the hand area and moving the second concentric center position toward the predetermined direction to scan the hand area, and obtaining a palm position in the hand area according to the number of skin color pixels on an inner circumference of the second couple of concentric circles and the number of skin color pixels on an outer circumference of the second couple of concentric circles during the scanning, wherein an outer circle and an inner circle of the second couple of concentric circles have different sizes and are both larger than those of the first couple of concentric circles, and the second predetermined position makes the second couple of concentric circles to be displayed in the hand area completely; and
  recognizing the gesture according to the number of fingertips and the palm position.

8. The method of gesture recognition as claimed in claim 7, wherein the scanning of the hand area by the second couple of concentric circles to determine the palm position in the hand area comprises:
  determining whether the current second concentric center position is the palm position according to a ratio of the number of skin color pixels on the inner circumference of the second couple of concentric circles to the number of pixels included on the inner circumference of the second couple of concentric circles, and a ratio of the number of skin color pixels on the outer circumference of the second couple of concentric circles to the number of pixels included on the outer circumference of the second couple of concentric circles;
  moving the second concentric center position toward the predetermined direction by taking a pixel as a unit of movement; and
  repeating both the determination of whether the second concentric center position is the palm position and the movement of the second concentric center position until the palm position has been obtained or the scanning of the hand area has finished.

9. The method of gesture recognition as claimed in claim 8, wherein the determination of whether the current second concentric center position is the palm position comprises:
  determining whether the number of skin color pixels on the inner circumference of the second couple of concentric circles equals the number of pixels included on the inner circumference of the second couple of concentric circles;
  when the number of skin color pixels on the inner circumference of the second couple of concentric circles equals the number of pixels included on the inner circumference of the second couple of concentric circles, determining whether the ratio of the number of skin color pixels on the outer circumference of the second couple of concentric circles to the number of pixels included on the outer circumference of the second couple of concentric circles is greater than a second predetermined value;
  when the ratio of the number of skin color pixels on the outer circumference of the second couple of concentric circles to the number of pixels included on the outer circumference of the second couple of concentric circles is greater than the second predetermined value, identifying the current second concentric center position to be the palm position; and
  recording the palm, position.

10. The method of gesture recognition as claimed in claim 9, wherein after determining whether the number of skin color pixels on the inner circumference of the second couple of concentric circles equals the number of pixels included on the inner circumference of the second couple of concentric circles, the method further comprises:
  when the number of skin color pixels on the inner circumference of the second couple of concentric circles does not equal the number of pixels included on the inner circumference of the second couple of concentric circles, identifying the current second concentric center position not to be the palm position.

11. The method of gesture recognition as claimed in claim 9, wherein after determining whether the ratio of the number of skin color pixels on the outer circumference of the second couple of concentric circles to the number of pixels included on the outer circumference of the second couple of concentric circles is greater than the second predetermined value, the method further comprises:
  when the ratio of the number of skin color pixels on the outer circumference of the second couple of concentric circles to the number of pixels included on the outer circumference of the second couple of concentric circles is not greater than the second predetermined value, identifying the current second concentric center position not to be the palm position.

12. The method of gesture recognition as claimed in claim 7, wherein the sizes of the first couple of concentric circles and the second couple of concentric circles are inversely proportional to a distance between the user and the video camera.

13. The method of gesture recognition as claimed in claim 7, wherein the recognition of the gesture according to the number of fingertips and the palm position comprises:
  defining n sector areas by referring to the palm position as a center, wherein each of the n sector areas corresponds to a direction respectively and n is a positive integer;
  calculating a number of the fingertip positions in each of the n sector areas;
  obtaining a specific sector area covering a greatest number of fingertip positions in the n sector areas; and
  identifying the gesture to conform with the direction corresponding to the specific sector area.

14. The method of gesture recognition as claimed in claim 13, wherein after the identification of the gesture to conform with the direction corresponding to the specific sector area, the method further comprises:
  executing the operation function of the electronic product correspondingly according to the number of fingertips and the direction of a recognized gesture.

15. The method of gesture recognition as claimed in claim 7, wherein the hand area consists of a left hand area and a right hand area, and the method further comprises:
  scanning the left hand area by the first couple of concentric circles to determine the number of fingertips in the left hand area;
  scanning the right hand area by the first couple of concentric circles to determine the number of fingertips in the right hand area;
  recognizing the gesture according to the number of fingertips in the left hand area and the number of fingertips in the right hand area; and executing the operation function of the electronic product correspondingly according to the recognized gesture.

16. The method of gesture recognition as claimed in claim 15, further comprising:
scanning the left hand area and the right hand area respectively by the first couple of concentric circles to determine the number of fingertips in the left hand area and the number of fingertips in the right hand area;
scanning the left hand area and the right hand area respectively by the second couple of concentric circles to determine the palm position in the left hand area and the palm position in the right hand area;
determining a left hand direction corresponding to the gesture according to the palm position in the left hand area;
determining a right hand direction corresponding to the gesture according to the palm position in the right hand area;
recognizing the gesture according to the number of fingertips in the left hand area and the left hand direction as well as the number of fingertips in the right hand area and the right hand direction; and
executing the operation function of the electronic product correspondingly according to the recognized gesture.

17. The method of gesture recognition as claimed in claim 1, wherein after capturing the image containing the upper body of the user, the method further comprises:
obtaining a predetermined skin color value; and
extracting a plurality of skin color areas coinciding with the predetermined skin color value in the captured image according to the predetermined skin color value.

18. The method of gesture recognition as claimed in claim 17, wherein the acquisition of the hand area in the image comprises:
obtaining three skin color areas possessing top three largest areas from the plurality of skin color areas;
analyzing whether each of the three skin color areas has a facial feature;
labeling the area having the facial feature in the three skin color areas as a face area; and
labeling the area without the facial feature in the three skin color areas as the hand area.

19. The method of gesture recognition as claimed in claim 18, wherein the facial feature includes a hair feature and a texture feature consisting of two eyes, two eye-brows, one nose, one mouth, and two ears.

20. The method of gesture recognition as claimed in claim 1, wherein the operation function at least includes a mouse function, a keyboard function, and a joystick function.

21. A system of gesture recognition, comprising:
a hand area detection module, configured to obtain a hand area in an image captured by an image capture module, wherein the image contains the upper body of a user of an electronic product, and a gesture performed by the user in front of the electronic product, wherein the electronic product comprises a computer system, a computer/television game, and an information appliance;
a fingertip feature capture module, placing a first concentric center position of a first couple of concentric circles at a first predetermined position in the hand area and moving the first concentric center position toward a predetermined direction to scan the entire hand area, and determining a number of fingertips in the hand area according to a number of skin color pixels on an inner circumference of the first couple of concentric circles and a number of skin color pixels on an outer circumference of the first couple of concentric circles during the scanning, wherein the first predetermined position makes the first couple of concentric circles to be displayed in the hand area completely and an outer circle and an inner circle of the first couple of concentric circles have different sizes;
a gesture recognition module, recognizing the gesture according to the number of fingertips; and
a function execution module, executing an operation function of the electronic product according to an operating instruction corresponding to the recognized gesture.

22. The system of gesture recognition as claimed in claim 21, further comprising:
an image pre-processing module, obtaining a predetermined skin color value and extracting a plurality of skin color areas coinciding with the predetermined skin color value in the captured image according to the predetermined skin color value.

23. The system of gesture recognition as claimed in claim 22, wherein the hand area detection module obtains three skin color areas possessing the top three largest areas from the plurality of skin color areas, analyzes which one of the three skin color areas has a facial feature, labels the area having the facial feature in one of the three skin color areas as a face area, and labels the area without the facial feature as the hand area, the facial feature includes a hair feature and a texture feature consisting of two eyes, two eye-brows, one nose, one mouth, and two ears.

24. The system of gesture recognition as claimed in claim 21, wherein the fingertip feature capture module determines whether the current first concentric center position is a fingertip position according to a ratio of the number of skin color pixels on the inner circumference of the first couple of concentric circles to a number of pixels included on the inner circumference of the first couple of concentric circles, and a ratio of the number of skin color pixels on the outer circumference of the first couple of concentric circles to a number of pixels included on the outer circumference of the first couple of concentric circles; when the current first concentric center position is not a fingertip position, moves the first concentric center position toward the predetermined direction by taking a pixel as a unit of movement; the fingertip feature capture module repeats both the determination of whether the first concentric center position is the fingertip position and the movement of the first concentric center position until the number of the fingertip positions obtained has reached a certain number or the scanning of the hand area has finished, and uses the number of the fingertip positions obtained as the number of fingertips,
the fingertip feature capture module determines whether the number of skin color pixels on the inner circumference of the first couple of concentric circles equals the number of pixels included on the inner circumference of the first couple of concentric circles; when the number of skin color pixels on the inner circumference of the first couple of concentric circles equals the number of pixels included on the inner circumference of the first couple of concentric circles, the fingertip feature capture module determines whether the ratio of the number of skin color pixels on the outer circumference of the first couple of concentric circles to the number of pixels on the outer circumference of the first couple of concentric circles is smaller than a first predetermined value; when the ratio of the number of skin color pixels on the outer circumference of the first couple of concentric circles to the number of pixels on the outer circumference of the first couple of concentric circles is smaller than the first predetermined value, then the fingertip feature capture module identifies the current first concentric center position to be the fingertip position and records the fingertip position, when the fingertip feature capture module determines the number of skin color pixels on the inner circumference of the first couple of concentric circles to be different from the number of pixels included on the inner circumference of the first couple of concentric circles, the current first concentric center position is identified not to be the fingertip position, when the fingertip feature capture module determines the ratio of the number of skin color pixels on the outer circumference of the first couple of concentric circles to the number of pixels included on the outer circumference of the first couple of concentric circles to be greater than or equal to the first predetermined value, the current first concentric center position is identified not to be the fingertip position.

25. The system of gesture recognition as claimed in claim 24, further comprising:

a palm feature capture module, overlapping a second concentric center position of a second couple of concentric circles to a second predetermined position in the hand area and moving the second concentric center position toward the predetermined direction to scan the hand area, and obtaining a palm position in the hand area according to the number of skin color pixels on an inner circumference of the second couple of concentric circles and the number of skin color pixels on an outer circumference of the second couple of concentric circles during the scanning, wherein an inner circle and an outer circle of the second couple of concentric circles have different sizes and are both larger than those of the first couple of concentric circles and the gesture recognition module recognizes the gesture by the number of fingertips and the palm position, wherein the second predetermined position makes the second couple of concentric circles to be displayed in the hand area completely, wherein the palm feature capture module determines whether the current second concentric center position is the palm position according to the ratio of the number of skin color pixels on the inner circumference of the second couple of concentric circles to the number of pixels included on the inner circumference of the second couple of concentric circles, and the ratio of the number of skin color pixels on the outer circumference of the second couple of concentric circles to the number of pixels included on the outer circumference of the second couple of concentric circles, when the current second concentric center position is not the palm position, moves the second concentric center position toward the predetermined direction by taking a pixel as a unit of movement; the palm feature capture module repeats both the determination of whether the second concentric center position is the palm position and the movement of the second concentric center position until the palm position has been obtained or the scanning of the hand area has finished, the palm feature capture module determines whether the number of skin color pixels on the inner circumference of the second couple of concentric circles equals the number of pixels included on the inner circumference of the second couple of concentric circles; when the number of skin color pixels on the inner circumference of the second couple of concentric circles equals the number of pixels included on the inner circumference of the second couple of concentric circles, determines whether the ratio of the number of skin color pixels on the outer circumference of the second couple of concentric circles to the number of pixels included on the outer circumference of the second couple of concentric circles is greater than a second predetermined value; when the ratio of the number of skin color pixels on the outer circumference of the second couple of concentric circles to the number of pixels included on the outer circumference of the second couple of concentric circles is greater than the second predetermined value, then identifies the current second concentric center position to be the palm position and records the palm position, when the palm feature capture module determines the number of skin color pixels on the inner circumference of the second couple of concentric circles to be different from the number of pixels included on the inner circumference of the second couple of concentric circles, the current second concentric center position is identified not to be the palm position, wherein when the palm feature capture module determines the ratio of the number of skin color pixels on the outer circumference of the second couple of concentric circles to the number of pixels included on the outer circumference of the second couple of concentric circles to be smaller than or equal to the second predetermined value, the current second concentric center position is identified not to be the palm position.

26. The system of gesture recognition as claimed in claim 25, wherein the sizes of the first couple of concentric circles and the second couple of concentric circles are inversely proportional to a distance between the user and the video camera.

27. The system of gesture recognition as claimed in claim 25, wherein the gesture recognition module defines n sector areas using the palm position as a center, wherein each of the n sector areas corresponds to a direction respectively and n is a positive integer; calculates a number of the fingertip positions in each of then sector areas; in the n sector areas, obtains a specific sector area covering a greatest number of fingertip positions and identifies the gesture to conform with the direction corresponding to the specific sector area, the function execution module correspondingly executes the operation function of the electronic product according to the number of fingertips and the direction of a recognized gesture.

28. The system of gesture recognition as claimed in claim 25, wherein the hand area consists of a left hand area and a right hand area, and the fingertip feature capture module scans the left hand area by the first couple of concentric circles to determine the number of fingertips in the left hand area and scans the right hand area by the first couple of concentric circles to determine the number of fingertips in the right hand area, then the gesture recognition module recognizes the gesture according to the number of fingertips in the left hand area and the number of fingertips in the right hand area, and the function execution module executes the operation function of the electronic product correspondingly according to the recognized gesture.

29. The system of gesture recognition as claimed in claim 28, wherein the fingertip feature capture module scans the left hand area and the right hand area respectively by the first couple of concentric circles to determine the number of fingertips in the left hand area and the number of fingertips in the right hand area; the palm feature capture module scans the left hand area and the right hand area respectively by the second couple of concentric circles to determine the palm position in the left hand area and the palm position in the right hand area; the gesture recognition module determines a left hand direction corresponding to the gesture according to the palm position in the left hand area and determines a right hand direction corresponding to the gesture according to the palm position in the right hand area, and recognizes the gesture according to the number of fingertips in the left hand area and the left hand direction as well as the number of fingertips in the right hand area and the right hand direction; the function execution module executes the operation function of the electronic product correspondingly according to the recognized gesture.

30. The system of gesture recognition as claimed in claim 28, wherein the operation function at least possesses a mouse function and a keyboard function of the computer system as well as a joystick function of the computer/television game, and further includes an operation interface of the information appliance.

31. The system of gesture recognition as claimed in claim 21, further comprising:
a recognition result display module, when the operation function correspondingly executed by the function execution module according to the recognized gesture is the mouse function, the recognition result display module demonstrates a virtual mouse panel having a size mapped to a monitor of the electronic product to notify a cursor position of the electronic product.

* * * * *